(12) United States Patent
Ooishi et al.

(10) Patent No.: US 8,492,480 B2
(45) Date of Patent: *Jul. 23, 2013

(54) BLOCK COPOLYMER COMPOSITION, METHOD FOR PRODUCING THE SAME, AND FILM OF THE SAME

(75) Inventors: Takeshi Ooishi, Tokyo (JP); Ryouji Oda, Tokyo (JP)

(73) Assignee: Zeon Corporation, Tokyo (JP)

( * ) Notice: Subject to any disclaimer, the term of this patent is extended or adjusted under 35 U.S.C. 154(b) by 173 days.

This patent is subject to a terminal disclaimer.

(21) Appl. No.: 12/935,361

(22) PCT Filed: Mar. 30, 2009

(86) PCT No.: PCT/JP2009/056449
§ 371 (c)(1),
(2), (4) Date: Oct. 25, 2010

(87) PCT Pub. No.: WO2009/123089
PCT Pub. Date: Oct. 8, 2009

(65) Prior Publication Data
US 2011/0046307 A1 Feb. 24, 2011

(30) Foreign Application Priority Data
Mar. 31, 2008 (JP) .................. 2008-091770

(51) Int. Cl.
*C08L 53/02* (2006.01)
*C08F 297/04* (2006.01)
*C08J 5/18* (2006.01)

(52) U.S. Cl.
USPC ........................................... 525/89; 525/271

(58) Field of Classification Search
USPC .................................... 525/89, 271
See application file for complete search history.

(56) References Cited

U.S. PATENT DOCUMENTS

| | | | |
|---|---|---|---|
| 4,104,327 A | 8/1978 | Inoue et al. | |
| 4,335,221 A * | 6/1982 | Gerberding | 525/89 |
| 4,386,125 A | 5/1983 | Shiraki et al. | |
| 4,699,938 A | 10/1987 | Minamizaki et al. | |
| 4,939,207 A | 7/1990 | Fasulo et al. | |
| 5,290,842 A | 3/1994 | Sasaki et al. | |
| 5,723,222 A | 3/1998 | Sato et al. | |
| 6,329,459 B1 * | 12/2001 | Kang et al. | 524/505 |
| 6,344,518 B1 | 2/2002 | Kobayashi et al. | |
| 6,531,263 B2 | 3/2003 | Knoll | |
| 6,593,430 B1 * | 7/2003 | Knoll et al. | 525/314 |
| 7,318,985 B2 | 1/2008 | Tsubaki et al. | |
| 2004/0242775 A1 | 12/2004 | Tahara et al. | |
| 2005/0009990 A1* | 1/2005 | Knoll et al. | 525/89 |
| 2005/0233249 A1 | 10/2005 | Muldermans et al. | |
| 2006/0099373 A1 | 5/2006 | Dupont et al. | |
| 2006/0205874 A1 | 9/2006 | Uzee et al. | |
| 2006/0205877 A1 | 9/2006 | DuBois | |
| 2006/0235165 A1 | 10/2006 | Kawanabe et al. | |
| 2008/0318161 A1 | 12/2008 | Nakano et al. | |
| 2011/0046307 A1 | 2/2011 | Takeshi et al. | |
| 2011/0257337 A1 | 10/2011 | Oda et al. | |

FOREIGN PATENT DOCUMENTS

| | | |
|---|---|---|
| CN | 102264854 A | 11/2011 |
| EP | 1625178 B1 | 7/2007 |
| GB | 1395822 A | 5/1975 |
| JP | 51-125135 A | 11/1976 |
| JP | 56-59230 A | 5/1981 |
| JP | 57-178722 A | 11/1982 |
| JP | 59-187048 A | 10/1984 |
| JP | 61-231070 A | 10/1986 |
| JP | 63-66277 A | 3/1988 |
| JP | 63-179956 A | 7/1988 |
| JP | 64-65152 A | 3/1989 |
| JP | 64-79251 A | 3/1989 |
| JP | 2-222440 A | 9/1990 |
| JP | 5-93176 A | 4/1993 |
| JP | 5-263056 A | 10/1993 |
| JP | 5-287084 A | 11/1993 |
| JP | 8-60121 A | 3/1996 |
| JP | 8-283685 A | 10/1996 |
| JP | 9-66554 A | 3/1997 |

(Continued)

OTHER PUBLICATIONS

International Search Report dated Jun. 9, 2009 in International Application No. PCT/JP2009/056449.
Extended European Search Report for European Application No. 10746236.8, dated Jun. 22, 2012.
International 2010 Search Report for International Application No. PCT/JP2009/071684, dated Feb. 2, 2010.
International 2010 Search Report for International Application No. PCT/JP2009/071692, dated Feb. 23, 2010.
International Search Report for International Application No. PCT/JP2010/052879, dated Mar. 23, 2010.
International Search Report for International Application No. PCT/JP2010/055580, dated Jun. 15, 2010.
International Search Report for International Application No. PCT/JP2010/055581, dated Jun. 29, 2010.

(Continued)

*Primary Examiner* — Jeffrey Mullis
(74) *Attorney, Agent, or Firm* — Birch, Stewart, Kolasch & Birch, LLP

(57) ABSTRACT

A block copolymer composition comprising an aromatic vinyl-conjugated diene-aromatic vinyl block copolymer having a high-level balance between a high elastic modulus and a small elongation set is provided. The block copolymer composition comprises a block copolymer A represented by formula (A) and a block copolymer B represented by formula (B), where the weight ratio of the block copolymer A to the block copolymer B, A/B, is from 36/64 to 85/15 and the ratio of the aromatic vinyl monomer units relative to all polymer components in the block copolymer composition is 27-70 wt %. $Ar1^a$-$D^a$-$Ar2^a$ (A). $Ar1^b$-$D^b$-$Ar2^b$ (B). (In the formulae, $Ar1^a$, $Ar1^b$ and $Ar2^b$ each represent an aromatic vinyl polymer block having a weight-average molecular weight of from 6,000 to 18,000; $Ar2^a$ represents an aromatic vinyl polymer block having a weight-average molecular weight of from 40,000 to 400,000; $D^a$ and $D^b$ each represent a conjugated diene polymer block having a vinyl bond content of from 1 to 20% by mol; and $D^b$ has a weight-average molecular weight of from 60,000 to 400,000).

3 Claims, No Drawings

FOREIGN PATENT DOCUMENTS

| | | |
|---|---|---|
| JP | 9-78048 A | 3/1997 |
| JP | 11-12430 A | 1/1999 |
| JP | 2000-155418 A | 6/2000 |
| JP | 2000-204129 A | 7/2000 |
| JP | 2001-504519 A | 4/2001 |
| JP | 2001-520244 A | 10/2001 |
| JP | 2002-60583 A | 2/2002 |
| JP | 2002-72457 A | 3/2002 |
| JP | 2002-519465 A | 7/2002 |
| JP | 2003-73434 A | 3/2003 |
| JP | 2003-261740 A | 9/2003 |
| JP | 2004-107519 A | 4/2004 |
| JP | 2004-238548 A | 8/2004 |
| JP | 2004-331707 A | 11/2004 |
| JP | 2005-510612 A | 4/2005 |
| JP | 2005-232246 A | 9/2005 |
| JP | 2006-89546 A | 4/2006 |
| JP | 2006-514338 A | 4/2006 |
| JP | 2006-241177 A | 9/2006 |
| JP | 2006-520826 A | 9/2006 |
| JP | 2006-274158 A | 10/2006 |
| JP | 2006-282683 A | 10/2006 |
| JP | 2006-528273 A | 12/2006 |
| JP | 2007-230180 A | 9/2007 |
| JP | 2008-7654 A | 1/2008 |
| JP | 2008-533230 A | 8/2008 |
| WO | WO 97/30844 A1 | 8/1997 |
| WO | WO 99/19388 A1 | 4/1999 |
| WO | WO 00/00546 A1 | 1/2000 |
| WO | WO 03/020825 A1 | 3/2003 |
| WO | WO 2004/074392 A1 | 9/2004 |
| WO | WO 2004/076556 A1 | 9/2004 |
| WO | WO 2004/104095 A1 | 12/2004 |
| WO | WO 2005/031458 A1 | 4/2005 |
| WO | WO 2006/051863 A1 | 5/2006 |
| WO | WO 2007/072613 A1 | 6/2007 |
| WO | WO 2009/123089 A1 | 10/2009 |

OTHER PUBLICATIONS

International Search Report for International Application No. PCT/JP2010/060760, dated Aug. 10, 2010.
US Office Action for U.S. Appl. No. 13/141,950, dated Sep. 11, 2012.
US Office Action for U.S. Appl. No. 13/142,065, dated Sep. 7, 2012.
US Office Action for U.S. Appl. No. 13/255,354, dated Aug. 31, 2012.
Office Action for U.S. Appl. No. 13/138,493, dated Feb. 19, 2013.
Notice of Allowance for U.S. Appl. No. 13/255,354, dated Mar. 18, 2013.
Office Action for U.S. Appl. No. 13/141,950, dated Mar. 21, 2013.

* cited by examiner

BLOCK COPOLYMER COMPOSITION, METHOD FOR PRODUCING THE SAME, AND FILM OF THE SAME

TECHNICAL FIELD

The present invention relates to a block copolymer composition comprising an aromatic vinyl-conjugated diene-aromatic vinyl block copolymer, a method for producing it, and a film of the block copolymer composition. More precisely, the present invention relates to a block copolymer composition that is suitably used as a material for forming a flexible film and the like favorably used for members of sanitary goods such as paper diapers and sanitary protections and has both a high elastic modulus and a small elongation set, to a production method favorable for obtaining the block copolymer composition and to a film of the block copolymer composition.

BACKGROUND ART

Aromatic vinyl-conjugated diene-aromatic vinyl block copolymers such as styrene/isoprene/styrene block copolymers (SIS) and styrene/butadiene/styrene block copolymers (SBS) are thermoplastic elastomers having characteristic properties in various aspects, and are therefore used in various applications. Of thermoplastic elastomers, aromatic vinyl-conjugated diene-aromatic vinyl block copolymers, in particular, are highly elastic and flexible, and are used as a material for flexible films used for sanitary goods such as paper diapers and sanitary protections for one typical application thereof.

Flexible films are used as various parts of sanitary goods such as paper diapers and sanitary protections, as they are required to have followability and fittability to the movement of wearers. For example, in training pants (pull-ups), a type of paper diapers, a flexible film is disposed in the openings around both legs, in the opening around the waist and in both the lower backs. The sanitary goods must not be out of alignment even when the wearers move violently or when they are worn for a long period of time, and therefore the flexible film to be used in such applications is required to have both a high elastic modulus and a small elongation set. However, it is hard to say that conventional aromatic vinyl-conjugated diene-aromatic vinyl block copolymers could satisfy both these characteristics. Accordingly, various investigations have been made for improving the elastic modulus and the elongation set of aromatic vinyl-conjugated diene-aromatic vinyl block copolymers.

For example, Patent Reference 1 discloses that an elastomer polymer blend composition comprising from 65 to 92 parts by weight of a specific elastomer monovinylidene aromatic/conjugated diene block copolymer having a monovinylidene aromatic content of less than 50% by weight, and from 8 to 35 parts by weight of a specific thermoplastic monovinylidene aromatic/conjugated diene block copolymer having a monovinylidene aromatic content of at least 50% by weight gives elastomer products showing excellent elasticity and stress relaxation characteristics.

Patent Reference 2 discloses a flexible film, which is produced through extrusion of a composition prepared by incorporating a specific polyisoprene or the like with a specific aromatic vinyl-conjugated diene block copolymer, is anisotropic, excellently flexible and favorable for use as members for sanitary goods such as paper diapers and sanitary protections.

However, even the techniques described in these references are still unsatisfactory in point of satisfying a high-level balance between a high elastic modulus and a small elongation set, and are required of further improvements.

PRIOR ART REFERENCES

Patent Reference 1: JP-T 2006-528273
Patent Reference 2: JP-A 2008-7654

DISCLOSURE OF THE INVENTION

Problems that the Invention is to Solve

An object of the present invention is to provide a block copolymer composition comprising an aromatic vinyl-conjugated diene-aromatic vinyl block copolymer having a high-level balance between a high elastic modulus and a small elongation set.

Means for Solving the Problems

The present inventors have assiduously studied for the purpose of attaining the above object and, as a result, have found that a block copolymer composition comprising an asymmetric aromatic vinyl-conjugated diene-aromatic vinyl block copolymer, in which the two aromatic vinyl polymer blocks have a different specific weight-average molecular weight from each other, and an aromatic vinyl-conjugated diene-aromatic vinyl block copolymer having a specific constitution differing from the former, in a specific ratio, has a high-level balance between a high elastic modulus and a small elongation set. Further, the inventors have assiduously investigated a method for producing the block copolymer composition, and have found that, according to a method comprising producing an aromatic vinyl-conjugated diene block copolymer having an active terminal, then coupling a part of the copolymer with a coupling agent and forming an aromatic vinyl polymer block at the active terminal of the remaining copolymer, a block copolymer composition having an especially favorable constitution can be produced with good producibility. The invention has been completed on the basis of these findings.

Thus, according to the invention, there is provided a block copolymer composition comprising a block copolymer A represented by the following general formula (A) and a block copolymer B represented by the following general formula (B), wherein the ratio by weight of the block copolymer A to the block copolymer B (A/B) is from 36/64 to 85/15 and the proportion of the aromatic vinyl monomer units relative to all the polymer components in the block copolymer composition is from 27 to 70% by weight.

$$Ar1^a\text{-}D^a\text{-}Ar2^a \tag{A}$$

$$Ar1^b\text{-}D^b\text{-}Ar2^b \tag{B}$$

In the general formulae (A) and (B), $Ar1^a$, $Ar1^b$ and $Ar2^b$ each represent an aromatic vinyl polymer block having a weight-average molecular weight of from 6,000 to 18,000; $Ar2^a$ represents an aromatic vinyl polymer block having a weight-average molecular weight of from 40,000 to 400,000; $D^a$ represents a conjugated diene polymer block having a vinyl bond content of from 1 to 20% by mol; and $D^b$ represents a conjugated diene polymer block having a vinyl bond content of from 1 to 20 mol % and having a weight-average molecular weight of from 60,000 to 400,000.

Also according to the invention, there is provided a film formed by shaping the above-mentioned block copolymer composition.

Further according to the invention, there is provided a method for producing the above-mentioned block copolymer composition of the invention, comprising the following steps (1) to (5):

(1): A step of polymerizing an aromatic vinyl monomer by using a polymerization initiator in a solvent.

(2): A step of adding a conjugated diene monomer to the solution containing the aromatic vinyl polymer having an active terminal obtained in the above step (1).

(3): A step of adding a bifunctional coupling agent to the solution containing the aromatic vinyl-conjugated diene block copolymer having an active terminal obtained in the above step (2), in such an amount that the functional group is less than 1 molar equivalent relative to the active terminal, thereby forming the block copolymer B.

(4): A step of adding an aromatic vinyl monomer to the solution obtained in the above step (3) to form the block copolymer A.

(5) A step of collecting the block copolymer composition from the solution obtained in the above step (4).

Advantage of the Invention

According to the invention, there is obtained a block copolymer composition comprising an aromatic vinyl-conjugated diene-aromatic vinyl block copolymer having a high-level balance between a high elastic modulus and a small elongation set. Also according to the invention, there is obtained a film having a high elastic modulus and a small elongation set, formed by shaping the composition. Further according to the production method of the invention, the block copolymer composition of the invention can be obtained with good producibility.

BEST MODE FOR CARRYING OUT THE INVENTION

The block copolymer composition of the invention contains two types of block copolymers. One block copolymer A of the two types of block copolymers constituting the block copolymer composition of the invention is an aromatic vinyl-conjugated diene-aromatic vinyl block copolymer having two types of aromatic vinyl polymer blocks each having a different weight-average molecular weight, as represented by the following formula (A).

$$Ar1^a\text{-}D^a\text{-}Ar2^a \quad (A)$$

In the general formula (A), $Ar1^a$ represents an aromatic vinyl polymer block having a weight-average molecular weight of from 6,000 to 18,000; $Ar2^a$ represents an aromatic vinyl polymer block having a weight-average molecular weight of from 40,000 to 400,000; and $D^a$ represents a conjugated diene polymer block having a vinyl bond content of from 1 to 20% by mol.

The other block copolymer B of the two types of block copolymers constituting the block copolymer composition of the invention is an aromatic vinyl-conjugated diene-aromatic vinyl block copolymer represented by the following general formula (B).

$$Ar1^b\text{-}D^b\text{-}Ar2^b \quad (B)$$

In the general formula (B), $Ar1^b$ and $Ar2^b$ each represent an aromatic vinyl polymer block having a weight-average molecular weight of from 6,000 to 18,000; and $D^b$ represents a conjugated diene polymer block having a vinyl bond content of from 1 to 20 mol % and having a weight-average molecular weight of from 60,000 to 400,000.

The aromatic vinyl polymer blocks ($Ar1^a$, $Ar2^a$, $Ar1^b$ and $Ar2^b$) of the block copolymer A and the block copolymer B are each a polymer block composed of aromatic vinyl monomer units.

The aromatic vinyl monomer to be used for constituting the aromatic vinyl monomer units of the aromatic vinyl polymer blocks is not specifically limited so far as it is an aromatic vinyl compound; and its examples include styrene, α-methylstyrene, 2-methylstyrene, 3-methylstyrene, 4-methylstyrene, 2-ethylstyrene, 3-ethylstyrene, 4-ethylstyrene, 2,4-diisopropylstyrene, 2,4-dimethylstyrene, 4-t-butylstyrene, 5-t-butyl-2-methylstyrene, 2-chlorostyrene, 3-chlorostyrene, 4-chlorostyrene, 4-bromostyrene, 2-methyl-4,6-dichlorostyrene, 2,4-dibromostyrene, vinylnaphthalene, and the like. Of those, preferably used is styrene.

One or more different types of such aromatic vinyl monomers may be used either singly or as combined in each aromatic vinyl block copolymer. In each aromatic vinyl polymer block, the same aromatic vinyl monomer may be used or different aromatic vinyl monomers may be used.

The aromatic vinyl polymer blocks ($Ar1^a$, $Ar2^a$, $Ar1^b$ and $Ar2^b$) of the block copolymer A and the block copolymer B each may contain any other monomer unit than aromatic vinyl monomer units.

Examples of the monomer that constitutes the other monomer unit than aromatic vinyl monomer units to be contained in the aromatic vinyl polymer block include conjugated diene monomers such as 1,3-butadiene and isoprene (2-methyl-1, 3-butadiene); α,β-ethylenically unsaturated nitrile monomers; α,β-ethylenically unsaturated carboxylic acid or acid anhydride monomers; α,β-ethylenically unsaturated carboxylate monomers; and nonconjugated diene monomers.

The content of the other monomer unit than aromatic vinyl monomer units in each aromatic vinyl polymer block is preferably at most 20% by weight, more preferably at most 10% by weight, even more preferably substantially 0% by weight.

The conjugated diene polymer blocks ($D^a$ and $D^b$) of the block copolymer A and the block copolymer B are polymer blocks composed of conjugated diene monomer units.

The conjugated diene to be used for constituting the conjugated diene monomer unit of the conjugated diene polymer block is not specifically limited so far as it is a conjugated diene compound; and its examples include 1,3-butadiene, isoprene, 2,3-dimethyl-1,3-butadiene, 2-chloro-1,3-butadiene, 1,3-pentadiene, 1,3-hexadiene, and the like.

Of those, preferred is use of 1,3-butadiene and/or isoprene, and more preferred is use of isoprene.

When the conjugated diene polymer block is composed of isoprene units, then a block copolymer composition excellent in flexibility and having a lower elongation set can be obtained.

One or more different types of such conjugated diene monomers may be used either singly or as combined in each conjugated diene polymer block. In each conjugated diene polymer block, the same conjugated diene monomer may be used or different conjugated diene monomers may be used. Further, a part of the unsaturated bonds of the conjugated diene polymer block may be hydrogenated.

The conjugated diene polymer blocks ($D^a$ and $D^b$) of the block copolymer A and the block copolymer B may contain any other monomer unit than conjugated diene monomer units. Examples of the monomer that constitutes the other monomer unit than conjugated diene monomer units to be contained in the conjugated diene polymer block include aromatic vinyl monomers such as styrene and α-methylstyrene; α,β-ethylenically unsaturated nitrile monomers; α,β-ethylenically unsaturated carboxylic acid or acid anhydride monomers; α,β-ethylenically unsaturated carboxylic ester monomers; and non-conjugated diene monomers. The content of the other monomer unit than conjugated diene monomer units in each conjugated diene polymer block is preferably at most 20% by weight, more preferably at most 10% by weight, even more preferably substantially 0% by weight.

In case where the block copolymer B is formed by coupling of aromatic vinyl-conjugated diene block copolymers with a coupling agent, the conjugated diene polymer block $D^b$ may contain the residue of the coupling agent.

The block copolymer A constituting the block copolymer composition of the invention is, as represented by the above general formula (A), an asymmetric aromatic vinyl-conjugated diene-aromatic vinyl block copolymer composed of an aromatic vinyl polymer block ($Ar1^a$) having a relatively small weight-average molecular weight, a conjugated diene polymer block ($D^a$) having a specific vinyl bond content and an aromatic vinyl polymer block ($Ar2^a$) having a relatively large weight-average molecular weight as connected in this order. The weight-average molecular weight ($Mw(Ar1^a)$) of the aromatic vinyl polymer block ($Ar1^a$) having a relatively small weight-average molecular weight is from 6,000 to 18,000, preferably from 6,000 to 15,000, more preferably from 7,000 to 14,000, even more preferably from 8,000 to 13,000. When $Mw(Ar1^a)$ oversteps the range, then the elongation set of the composition to be obtained may be insufficient. The weight-average molecular weight ($Mw(Ar2^a)$) of the aromatic vinyl polymer block ($Ar2^a$) having a relatively large weight-average molecular weight is from 40,000 to 400,000, preferably from 42,000 to 370,000, more preferably from 45,000 to 350,000. When $Mw(Ar2^a)$ is too small, then the elongation set of the composition to be obtained may be insufficient; but when $Mw(Ar2^a)$ is too large, then the block copolymer A may be difficult to produce.

In the block copolymer A, the ratio of the weight-average molecular weight ($Mw(Ar2^a)$) of the aromatic vinyl polymer block ($Ar2^a$) having a relatively large weight-average molecular weight to the weight-average molecular weight ($Mw(Ar1^a)$) of the aromatic vinyl polymer block ($Ar1^a$) having a relatively small weight-average molecular weight, ($Mw(Ar2^a)/Mw(Ar1^a)$), is not specifically limited, but is generally from 2.2 to 67, preferably from 2.6 to 67, more preferably from 4 to 40, even more preferably from 4.5 to 35. When the block copolymer A is constituted in that manner, then a highly elastic block copolymer composition having a lower elongation set and a higher elastic modulus can be obtained.

The vinyl bond content (the proportion of 1,2-vinyl bond and 3,4-vinyl bond in all the conjugated diene monomer units) in the conjugated diene polymer block ($D^a$) of the block copolymer A is from 1 to 20% by mol, preferably from 2 to 15% by mol, more preferably from 3 to 10% by mol. When the vinyl bond content is too high, then the elongation set of the block copolymer composition to be obtained may be large.

Not specifically limited, the weight-average molecular weight ($Mw(D^a)$) of the conjugated diene polymer block ($D^a$) of the block copolymer A is generally from 20,000 to 200,000, preferably from 30,000 to 150,000, more preferably from 35,000 to 100,000.

Not specifically limited, the content of the aromatic vinyl monomer units to all the monomer units in the block copolymer A is generally from 40 to 90% by weight, preferably from 45 to 87% by weight, more preferably from 50 to 85% by weight.

The weight-average molecular weight of the whole block copolymer A is not also specifically limited, but is generally from 70,000 to 500,000, preferably from 80,000 to 470,000, more preferably from 90,000 to 450,000.

The block copolymer B constituting the block copolymer composition of the invention is, as represented by the above general formula (B), an aromatic vinyl-conjugated diene-aromatic vinyl block copolymer that has two aromatic vinyl polymer blocks ($Ar1^b$ and $Ar2^b$) each having a specific weight-average molecular weight bonded to each end of a conjugated diene polymer block ($D^b$) having a specific vinyl bond content.

The weight-average molecular weights ($Mw(Ar1^b)$ and $Mw(Ar2^b)$) of the two aromatic vinyl polymer blocks ($Ar1^b$ and $Ar2^b$) of the block copolymer B are each from 6,000 to 18,000, preferably from 6,000 to 15,000, more preferably from 7,000 to 14,000, even more preferably from 8,000 to 13,000. When $Mw(Ar1^b)$ and $Mw(Ar2^b)$ overstep the range, then the elongation set of the composition to be obtained may be insufficient. The weight-average molecular weights ($Mw(Ar1^b)$ and $Mw(Ar2^b)$) of the two aromatic vinyl polymer blocks may be the same or different from each other so far as they fall within the above range, but are preferably substantially the same. More preferably, the weight-average molecular weights ($Mw(Ar1^b)$ and $Mw(Ar2^b)$) of the two aromatic vinyl polymer blocks are substantially the same as the weight-average molecular weight ($Mw(Ar1^a)$) of the aromatic vinyl polymer block ($Ar1^a$) having a relatively small weight-average molecular weight of the block copolymer A.

The vinyl bond content of the conjugated diene polymer block ($D^b$) of the block copolymer B is from 1 to 20% by mol, preferably from 2 to 15% by mol, more preferably from 3 to 10% by mol. When the vinyl bond content is too high, then the elongation set of the block copolymer composition to be obtained may be large.

Preferably, the vinyl bond content of the conjugated diene polymer block ($D^b$) of the block copolymer B is substantially the same as the vinyl bond content of the conjugated diene polymer block ($D^a$) of the block copolymer A.

The weight-average molecular weight ($Mw(D^b)$) of the conjugated diene polymer block ($D^b$) of the block copolymer B is from 60,000 to 400,000, preferably from 60,000 to 300,000, more preferably from 60,000 to 200,000, even more preferably from 90,000 to 200,000. When the weight-average molecular weight ($Mw(D^b)$) of the conjugated diene polymer block ($D^b$) falls within the range, then a highly elastic block copolymer composition having a lower elongation set and a higher elastic modulus can be obtained.

Preferably, the ratio of the weight-average molecular weight ($Mw(D^b)$) of the conjugated diene polymer block ($D^b$) of the block copolymer B to the weight-average molecular weight ($Mw(D^a)$) of the conjugated diene polymer block ($D^a$) of the block copolymer A, ($Mw(D^b)/Mw(D^a)$), is from 1.1 to 10, more preferably from 1.3 to 5, even more preferably from 1.5 to 3. When the value of $Mw(D^b)/Mw(D^a)$ is as above, the block copolymer composition to be obtained may have a higher elastic modulus and therefore may be highly elastic.

Not specifically limited, the content of the aromatic vinyl monomer units relative to all the monomer units in the block copolymer B is generally from 10 to 35% by weight, preferably from 12 to 32% by weight, more preferably from 15 to 30% by weight.

The weight-average molecular weight of the whole block copolymer B is not also specifically limited, but is generally from 70,000 to 400,000, preferably from 70,000 to 300,000, more preferably from 70,000 to 200,000, even more preferably from 100,000 to 200,000.

Not specifically limited, the molecular weight distribution, as represented by the ratio (Mw/Mn) of the weight-average molecular weight (Mw) to the number-average molecular weight (Mn), of the block copolymer A and the block copolymer B constituting the block copolymer composition of the invention as well as the polymer blocks constituting these block copolymers, is generally at most 1.1, preferably at most 1.05 each.

The ratio by weight (A/B) of the block copolymer A to the block copolymer B contained in the block copolymer composition of the invention is from 36/64 to 85/15, preferably from 38/62 to 80/20, more preferably from 40/60 to 75/25. The block copolymer composition containing the block copolymers in the ratio as above may have a high-level balance between a high elastic modulus and a small elongation set. When the ratio is too small, then the elastic modulus of the block copolymer composition is insufficient; but when the ratio is too large, then the elongation set of the block copolymer composition is large.

The block copolymer composition of the invention may contain only the block copolymer A and the block copolymer B as the polymer ingredients, but may contain any other polymer ingredient than the block copolymer A and the block copolymer B.

The other polymer ingredient than the block copolymer A and the block copolymer B that may be contained in the block copolymer composition of the invention includes other aromatic vinyl-conjugated diene-aromatic vinyl block copolymers than the block copolymer A and the block copolymer B, aromatic vinyl-conjugated diene copolymers, aromatic vinyl homopolymers, conjugated diene homopolymers, aromatic vinyl-conjugated diene random copolymers and their branched polymers; thermoplastic elastomers such as polyurethane-based thermoplastic elastomers, polyamide-based thermoplastic elastomers and polyester-based thermoplastic elastomers; thermoplastic resins such as polyethylene, polypropylene, polyvinyl chloride, acrylonitrile-styrene copolymers, acrylonitrile-butadiene-styrene copolymers and polyphenylene ether; and the like.

In the block copolymer composition of the invention, the content of the other polymer ingredient than the block copolymer A and the block copolymer B is preferably at most 20% by weight relative to all the polymer ingredients therein, more preferably at most 10% by weight.

In the block copolymer composition of the invention, the proportion of the aromatic vinyl monomer units relative to all the polymer ingredients therein (hereinafter this may be referred to as "overall aromatic vinyl monomer unit content") may be from 27 to 70% by weight, preferably from 30 to 60% by weight, more preferably from 40 to 50% by weight.

When the overall aromatic vinyl monomer unit content is too small, then the elastic modulus of the block copolymer composition to be obtained may be insufficient; but when the overall aromatic vinyl monomer unit content is too large, then the elongation set of the block copolymer composition to be obtained may be large. The overall aromatic vinyl monomer unit content can be readily controlled by controlling the proportions of the block copolymer A, the block copolymer B and the other polymer ingredient than these constituting the block copolymer composition considering the aromatic vinyl monomer unit content of these (co)polymers.

In case where all the polymer ingredients constituting the block copolymer composition are composed only of aromatic vinyl monomer units and conjugated diene monomer units, the polymer ingredients of the block copolymer composition may be ozonolyzed according to the method described in Rubber Chemistry and Technology, Vol. 45, p. 1295 (1972), and then reduced with lithiumaluminium hydride, whereby the conjugated diene monomer unit moieties can be decomposed and only the aromatic vinyl monomer unit moieties may be collected; and according to this process, therefore, the overall aromatic vinyl monomer unit content can be readily determined.

Not specifically limited, the weight-average molecular weight of all the polymer ingredients constituting the block copolymer composition of the invention is generally from 50,000 to 500,000, preferably from 60,000 to 450,000, more preferably from 70,000 to 400,000.

Not specifically limited, the molecular weight distribution represented by the ratio (Mw/Mn) of the weight-average molecular weight (Mw) to the number-average molecular weight (Mn) of all the polymer ingredients constituting the block copolymer composition of the invention is generally from 1.01 to 10, preferably from 1.03 to 5, more preferably from 1.05 to 3.

Not specifically limited, the melt index of the block copolymer composition of the invention is, as measured according to ASTM D-1238 (condition G, 200° C., 5 kg), generally from 1 to 70 g/10 min, preferably from 3 to 65 g/10 min, more preferably from 5 to 60 g/10 min. When the melt index falls within the range, the shapability of the block copolymer composition into films and the like may be good.

The block copolymer composition of the invention may contain any other ingredient than the polymer ingredients, and for example, it may contain, if desired, additives such as a softener, a tackifier, an antioxidant, an antibacterial agent, a light stabilizer, a UV absorbent, a dye, a lubricant, a crosslinking agent, a crosslinking promoter, and the like.

The method for producing the block copolymer composition of the invention is not specifically limited. For example, according to an ordinary production method for block copolymers, it may be produced by separately preparing the block copolymer A and the block copolymer B, then optionally adding any other polymer ingredient and various additives thereto, and then mixing them in an ordinary manner such as kneading or mixing in solution. However, from the viewpoint of producing the block copolymer composition having an especially preferred constitution of the invention with better producibility, a production method mentioned below is preferred for the block copolymer composition of the invention.

The production method for the block copolymer composition of the invention comprises the following steps (1) to (5):

(1): A step of polymerizing an aromatic vinyl monomer by using a polymerization initiator in a solvent.

(2): A step of adding a conjugated diene monomer to the solution containing the aromatic vinyl polymer having an active terminal obtained in the above step (1).

(3): A step of adding a bifunctional coupling agent to the solution containing the aromatic vinyl-conjugated diene block copolymer having an active terminal obtained in the above step (2), in such an amount that the functional group is less than 1 molar equivalent relative to the active terminal, thereby forming the block copolymer B.

(4): A step of adding an aromatic vinyl monomer to the solution obtained in the above step (3) to form the block copolymer A.

(5) A step of collecting the block copolymer composition from the solution obtained in the above step (4).

In the production method for the block copolymer composition of the invention, first an aromatic vinyl monomer is polymerized using a polymerization initiator in a solvent.

As the polymerization initiator, usable are organic alkali metal compounds, organic alkaline earth metal compounds, organic lanthanoid rare earth metal compounds and the like that are generally known to have anionic polymerization activity to aromatic vinyl monomers and conjugated diene monomers.

As the organic alkali metal compounds, preferred are organic lithium compounds having at least one lithium atom in the molecule; and their examples include organic monolithium compounds such as ethyl-lithium, n-propyl-lithium, isopropyl-lithium, n-butyl-lithium, sec-butyl-lithium, t-butyl-lithium, hexyl-lithium, phenyl-lithium, stilbene-lithium, dialkylamino-lithium, diphenylamino-lithium and ditrimethylsilylamino-lithium; organic dilithium compounds such as methylene-dilithium, tetramethylene-dilithium, hexamethylene-dilithium, isoprenyl-dilithium and 1,4-dilithio-ethylcyclohexane; further organic trilithium compounds such as 1,3,5-trilithiobenzene; and the like.

Of those, organic monolithium compounds are especially favorably used.

The organic alkaline earth metal compounds to be used as the polymerization initiator include, for example, n-butylmagnesium bromide, n-hexylmagnesium bromide, ethoxycalcium, calcium stearate, t-butoxy-strontium, ethoxybarium, isopropoxy-barium, ethylmercapto-barium, t-butoxy-barium, phenoxy-barium, diethylamino-barium, barium stearate, ethyl-barium, and the like.

Examples of other polymerization initiators include those capable of forming a homogeneous system in an organic solvent and having living polymerization activity, such as composite catalysts of lanthanoid rare earth metal compound including neodymium, samarium, gadolinium or the like/alkyl-aluminium/alkylaluminium halide/alkylaluminium hydride and metallocene catalysts containing titanium, vanadium, samarium, gadolinium or the like.

One or more such polymerization initiators may be used either singly or as combined.

Not specifically limited, the amount of the polymerization initiator to be used may be determined in accordance with the molecular weight of the intended block copolymer; and in general, it is from 0.01 to 20 mmol relative to 100 g of all the monomers to be used, preferably from 0.05 to 15 mmols, more preferably from 0.1 to 10 mmols.

Not specifically limited, the solvent used for polymerization may be any one inert to the polymerization initiator, for which, for example, usable are linear hydrocarbon solvents, cyclic hydrocarbon solvents or their mixed solvents.

Examples of the linear hydrocarbon solvents include linear alkanes and alkenes having from 4 to 6 carbon atoms, such as n-butane, isobutane, 1-butene, isobutylene, trans-2-butene, cis-2-butene, 1-pentene, trans-2-pentene, cis-2-pentene, n-pentane, isopentane, neo-pentane and n-hexane.

Examples of the cyclic hydrocarbon solvents include aromatic compounds such as benzene, toluene and xylene; and alicyclic hydrocarbon compounds such as cyclopentane and cyclohexane.

One or more such solvents may be used either singly or as combined.

Not specifically limited, the amount of the solvent to be used in polymerization may be so defined that the concentration of all the block copolymers in the solution after the polymerization reaction could be generally from 5 to 60% by weight, preferably from 10 to 55% by weight, more preferably from 20 to 50% by weight.

For controlling the structure of each polymer block of each block copolymer in producing the block copolymer composition, a Lewis base compound may be added to the reactor used for polymerization.

The Lewis base compound includes, for example, ethers such as tetrahydrofuran, diethyl ether, dioxane, ethylene glycol dimethyl ether, ethylene glycol dibutyl ether, diethylene glycol dimethyl ether and diethylene glycol dibutyl ether; tertiary amines such as tetramethylethylenediamine, trimethylamine, triethylamine, pyridine and quinuclidine; alkali metal alkoxides such as potassium t-amyl oxide and potassium t-butyl oxide; phosphines such as triphenyl phosphine; and the like.

One or more such Lewis base compounds may be used either singly or as combined, and may be suitably selected with a range not detracting from the object of the invention.

The time when the Lewis base compound is to be added during polymerization is not specifically limited, and may be suitably determined in accordance with the structure of the intended individual block copolymers. For example, it may be added previously before the start of polymerization, or may be added after a part of polymer blocks is formed through polymerization; or further, it may be added previously before the start of polymerization and may be further added after a part of polymer blocks is formed through polymerization.

The polymerization reaction temperature is generally from 10 to 150° C., preferably from 30 to 130° C., more preferably from 40 to 90° C. The time necessary for polymerization varies depending on the condition, but is generally within 48 hours, preferably from 0.5 to 10 hours.

The polymerization pressure may be within a range of pressure sufficient for maintaining the monomer and the solvent in a liquid phase within the above-mentioned polymerization temperature range, and is therefore not specifically limited.

Under the condition as above, an aromatic vinyl monomer is polymerized using a polymerization initiator in a solvent thereby giving a solution containing an aromatic vinyl polymer having an active terminal.

The aromatic vinyl polymer having an active terminal constitutes the aromatic vinyl polymer block ($Ar1^a$) having a relatively small weight-average molecular weight of the block copolymer A and the aromatic vinyl polymer blocks ($Ar1^b$ and $Ar2^b$) of the block copolymer B, each constituting the block copolymer composition.

Accordingly, the amount of the aromatic vinyl monomer to be used in this stage is determined depending on the intended weight-average molecular weight of these polymer blocks.

In the production method for the block copolymer composition of the invention, a conjugated diene monomer is added to the solution containing the aromatic vinyl polymer having an active terminal. The conjugated diene monomer added forms a conjugated diene polymer chain extending from the active terminal, thereby giving a solution containing an aromatic vinyl-conjugated diene block copolymer having an active terminal. The amount of the conjugated diene monomer to be used in this stage is so determined that the conjugated diene polymer chain to be formed could have a half of the intended weight-average molecular weight of the conjugated diene polymer block ($D^b$) of the block copolymer B.

In the production method for the block copolymer composition of the invention, a bifunctional coupling agent is added to the solution containing the aromatic vinyl-conjugated diene block copolymer having an active terminal, in such an amount that the functional group is less than 1 molar equivalent relative to the active terminal.

Not specifically limited, the coupling agent to be added may be any bifunctional one, and includes, for example, bifunctional halogenosilanes such as dichlorosilane, monomethyldichlorosilane and dimethyldichlorosilane; bifunctional halogenoalkanes such as dichloroethane, dibromoethane, methylene chloride and dibromomethane; bifunctional halogenotins such as dichlorotin, monomethyldichlorotin, dimethyldichlorotin, monoethyldichlorotin, diethyldichlorotin, monobutyldichlorotin and dibutyldichlorotin; and the like.

One or more such coupling agents may be used either singly or as combined.

The amount of the coupling agent to be added is determined in accordance with the ratio of the block copolymer A and the block copolymer B to constitute the block copolymer composition and is not specifically limited so far as the amount could be such that the functional group is less than 1 molar equivalent relative to the active terminal of the polymer. In general, the amount is such that the functional group of the bifunctional coupling agent could be within a range of from 0.15 to 0.90 molar equivalents relative to the active terminal of the polymer, preferably within a range of from 0.20 to 0.70 molar equivalents.

As in the above, when a bifunctional coupling agent is added to the solution containing the aromatic vinyl-conjugated diene block copolymer having an active terminal in such an amount that the functional group could be less than 1 molar equivalent relative to the active terminal, then the conjugated diene polymer blocks in a part of the aromatic vinyl-conjugated diene block copolymer having an active terminal are bonded to each other via the residue of the bifunctional coupling agent and, as a result, the block polymer B of the block copolymer composition is thereby formed. The remaining part of the active terminal-having aromatic vinyl-conjugated diene block copolymer not reacted with the bifunctional coupling agent remains unreacted as such in the solution.

In the production method for the block copolymer composition of the invention, in the subsequent step, an aromatic vinyl monomer is added to the solution prepared in the manner as above.

When an aromatic vinyl monomer is added to the solution, then an aromatic vinyl polymer chain is formed extending from the terminal of the active terminal-having aromatic vinyl-conjugated diene block copolymer not reacted with the coupling agent but remaining in the solution. The aromatic vinyl polymer chain constitutes the aromatic vinyl polymer block ($Ar2^a$) having a relatively large weight-average molecular weight of the block copolymer A that constitutes the block copolymer composition. Accordingly, the amount of the aromatic vinyl monomer to be used in this stage is determined in accordance with the intended weight-average molecular weight of the aromatic vinyl polymer block ($Ar2^a$). The step of adding the aromatic vinyl monomer forms an asymmetric aromatic vinyl-conjugated diene-aromatic vinyl block copolymer to constitute the block copolymer A, thereby providing a solution containing the block copolymer A and the block copolymer B.

Prior to the step of adding the aromatic vinyl monomer, a conjugated diene monomer may be added to the solution containing the active terminal-having aromatic vinyl-conjugated diene block copolymer not reacted with the bifunctional coupling agent.

Addition of a conjugated diene monomer may increase the weight-average molecular weight of the conjugated diene polymer block ($D^a$) of the block copolymer A, as compared with a case where it is not added.

If desired, a polymerization terminator (water, methanol or the like) may be added in an amount smaller than the equivalent of the active terminal to the solution containing the active terminal-having aromatic vinyl-conjugated diene block copolymer not reacted with the bifunctional coupling agent. Addition of the polymerization terminator inactivates the active terminal of the aromatic vinyl-conjugated diene block copolymer, and the resulting aromatic vinyl-conjugated diene block copolymer (diblock form) is contained in the block copolymer composition.

In the production method for the block copolymer composition of the invention, the intended block copolymer composition is collected from the solution containing the block copolymer A and the block copolymer B produced in the manner as above.

The collection method may be in any ordinary method and is not specifically limited. For example, after the reaction, if desired, a polymerization terminator such as water, methanol, ethanol, propanol, hydrochloric acid, or citric acid is added, and further if desired, an additive such as an antioxidant is added, and the solution is processed according to a known method of direct drying or steam stripping, whereby the block copolymer composition is collected from it.

In case where the block copolymer composition is collected as slurry through steam stripping, the solution is dewatered with an arbitrary dewatering machine such as an extrusion-type squeezer to give crumb having a water content not more than a predetermined level, and the crumb may be dried with an arbitrary drier such as a hand drier, or an expansion-extrusion drier.

The block copolymer composition obtained in the manner as above may be processed according to an ordinary method into pellets or the like before use thereof.

According to the production method for the block copolymer composition of the invention, the block copolymer A and the block copolymer B may be produced continuously in the same reactor, and therefore, as compared with a case where the individual block copolymers are produced separately and then mixed, the intended block copolymer composition can be produced with extremely excellent producibility. Moreover, the weight-average molecular weight of each polymer block of each block copolymer in the obtained block copolymer composition is especially favorably well-balanced as the block copolymer composition of the invention, and therefore, the composition can have a high-level balance between a high elastic modulus and a small elongation set.

Not specifically limited in point of the use thereof, the block copolymer composition of the invention is usable, for example, for applications of shaping materials for elastic films, gloves, elastic bands, condoms, OA appliances, various rolls for office machinery, vibration-proofing sheets for electric/electronic appliances, vibration-proofing rubbers, shock-absorbing sheets, impact buffer films/sheets, residential damping sheets, vibration damper materials, and the like; for applications for adhesives used for adhesive tapes, adhesive sheets, adhesive labels, dust-catching rollers, and the like; for applications for adhesives used for sanitary goods or bookbinding; for applications for elastic fibers for use for clothes, sports goods, and the like; and for other applications.

Of those, the block copolymer composition of the invention is, as having both a high elastic modulus and a small elongation set, especially favorably used for materials for elastic films used for sanitary goods such as paper diapers and sanitary protections.

The method for shaping the block copolymer composition of the invention into films is not specifically limited, to which any conventional known film formation method is applicable. From the viewpoint of producing smooth films with good producibility, extrusion is favorable, and extrusion with a T-die is especially favorable.

As an example of extrusion with a T-die, there may be mentioned a method comprising extruding the block copolymer composition melted at 150 to 250° C., through a T-die fitted to a single-screw extruder or a double-screw extruder, and then winding it up with cooling with a take-up roll. In the step of cooling with a take-up roll, the film may be stretched. In winding up the film, the melt of the block copolymer composition may be cast on a substrate of a polyethylene terephthalate, polyethylene, polypropylene, unwoven fabric or release paper, for film formation thereon. The melt of the block copolymer composition may be sandwiched between those substrates for film formation therebetween. The thus-produced film may be used as integrated with the substrate, or may be peeled away from the substrate.

The thickness of the film to be formed of the block copolymer composition of the invention may be suitably controlled depending on the use thereof. In case where the film is used as a film for sanitary goods such as paper diapers or sanitary protections, in general, its film is from 0.01 to 50 mm, preferably from 0.03 to 1 mm, more preferably from 0.05 to 0.5 mm.

The film formed of the block copolymer composition of the invention may be used as laminated with any other member. For example, the film formed of the block copolymer composition of the invention is slit, then a hot melt adhesive or the like is applied thereto to give a tape, and the tape is, while kept shrunk, stuck to an unwoven fabric, a woven fabric, a plastic film or their laminate, thereby forming a flexible gather member that may be expanded by relaxing the tape shrinkage. Further, according to other applications, the film may be processed in a known method to give, for example, elastic members such as substrates for flexible packing sheets, gloves, surgical gloves, fingertips, hemostatic bands, birth-control devices, head bands, goggle bands, rubber bands, and the like.

EXAMPLES

The invention is described more concretely with reference to the following Examples and Comparative Examples. In these Examples, part and % are all by weight unless otherwise specifically indicated.

The samples were analyzed according to the following methods.
[Weight-Average Molecular Weight of Block Copolymer and Block Copolymer Composition]

The molecular weight was determined in terms of polystyrene through high-performance liquid chromatography with tetrahydrofuran as a carrier at a flow rate of 0.35 ml/min. As the apparatus, used was Tosoh's HLC8220; as the columns, used were three connected columns of Showa Denko's Shodex KF-404HQ (column temperature, 40° C.); as the detectors, used were a differential refractometer and a UV detector; and for molecular weight calibration, used were 12 standard polystyrenes (from 500 to 3,000,000) of Polymer Laboratories.
[Weight Ratio of Block Copolymer A and Block Copolymer B]

It was determined from the a real ratio of peaks corresponding to the individual block copolymers of the above high-performance liquid chromatography charts.
[Weight-Average Molecular Weight of Styrene Polymer Block]

According to the method described in Rubber Chemistry and Technology, Vol. 45, p. 1295 (1972), the block copolymer was reacted with ozone and reduced with lithiumaluminium hydride to thereby decompose the isoprene polymer block of the block copolymer.

Concretely, the process is as follows: 300 mg of the sample was dissolved in a reactor filled with 100 ml of dichloromethane processed through a molecular sieve. The reactor was put in a cooling tank, and kept at −25° C. With oxygen introduced into the reactor at a flow rate of 170 ml/min, ozone generated by an ozone generator was introduced thereinto. In 30 minutes after the start of the reaction, the vapor flowing out of the reactor was introduced into an aqueous potassium iodide solution, and the finish of the reaction was confirmed.

Next, 50 ml of diethyl ether and 470 mg of lithiumaluminium hydride were put into a different reactor purged with nitrogen, and with cooling the reactor with iced water, the ozone-reacted solution was gradually and dropwise put into the reactor. Then, the reactor was set in a water bath, gradually heated, and the liquid therein was refluxed for 30 minutes at 40° C. Subsequently, with stirring the solution therein, diluted hydrochloric acid was dropwise put into the reactor little by little, and the addition was continued until hydrogen generation was almost stopped. After the reaction, the solid product formed in the solution was collected through filtration, and the solid product was extracted with 100 ml of diethyl ether for 10 minutes. The extract was combined with the above filtrate resulting from the filtration, and the solvent was evaporated away to give a solid sample. Thus collected sample was analyzed for the weight-average molecular weight thereof according to the above-mentioned measurement method, and the weight-average molecular weight thereof was measured. This was regarded as the weight-average molecular weight of the styrene polymer block.
[Weight-Average Molecular Weight of Isoprene Polymer Block]

From the weight-average molecular weight of the block copolymer thus determined according to the above, the weight-average molecular weight of corresponding styrene polymer block was subtracted; and based on the computed data, the weight-average molecular weight of the isoprene block copolymer was determined.
[Styrene Unit Content of Block Copolymer]

It was determined based on the detected intensity ratio with the differential diffractiometer and the UV detector in the above-mentioned high-performance liquid chromatography. Copolymers each having a different styrene unit content were previously prepared, and using them, a calibration curve was formed.
[Styrene Unit Content of Block Copolymer Composition]

It was determined based on proton NMR data.
[Vinyl Bond Content of Isoprene Polymer Block]

It was determined based on proton NMR data.
[Melt Index]

It was determined in accordance with ASTM D-1238 (G condition, 200° C., 5 kg).
[Elastic Modulus of Film]

The elastic modulus of film in 50% elongation was measured at a tension rate of 300 mm/min, using ORIENTEC's Tensilon Universal Tester RTC-1210. Prior to the measurement, the film was once 100% elongated under the same condition.
[Elongation Set of Film]

It was determined according to ASTM 412, using the above Tensilon Universal Tester. Concretely, the sample form was Die A, and the marker-to-marker distance before elongation was 40 mm. Under the condition, the film was elongated to an elongation of 200%, then kept as such for 10 minutes, and rapidly shrunk without being bounced; and this was left as such for 10 minutes, the marker-to-marker distance thereof was measured, and the elongation set thereof was determined according to the following formula:

Elongation set(%)=100×($L_1$-$L_0$)/$L_0$ $L_0$: marker-to-marker distance (mm) before elongation,
$L_1$: marker-to-marker distance (mm) after shrunk and left for 10 minutes.

Example 1

23.3 kg of cyclohexane, 2.2 mmol of N,N,N',N'-tetramethylethylenediamine (hereinafter referred to as "TMEDA") and 1.40 kg of styrene were put into a pressure-resistant reactor, and with stirring them at 40° C., 149.6 mmol of n-butyllithium was added thereto, and polymerized for 1 hour with heating up to 50° C. The polymerization conversion of styrene was 100%.

Subsequently, with temperature controlled so as to keep the system at 50 to 60° C., 6.50 kg of isoprene was continuously added to the reactor, taking 1 hour. After the addition of isoprene, this was further polymerized for 1 hour. The polymerization conversion of isoprene was 100%.

Next, as a coupling agent, 47.1 mmol of dimethyldichlorosilane was added to and coupled with it for 2 hours to form a styrene/isoprene/styrene block copolymer to be the block copolymer B.

After this, with temperature controlled so as to keep the system at 50 to 60° C., 2.10 kg of styrene was continuously added to it, taking 1 hour. After the addition of styrene, this was further polymerized for 1 hour to form a styrene/isoprene/styrene block copolymer to be the block copolymer A. The polymerization conversion of styrene was 100%.

After this, as a polymerization terminator, 299.1 mmol of methanol was added to it and well mixed to terminate the reaction. The amount of each reagent used in the reaction is shown in Table 1.

A part of the thus-obtained reaction liquid was sampled, and analyzed for the weight-average molecular weight of each block copolymer and the block copolymer composition, the weight-average molecular weight of each styrene polymer block, the weight-average molecular weight of each isoprene polymer block, the styrene unit content of each block copolymer, the styrene unit content of the block copolymer composition, and the vinyl bond content of the isoprene polymer block. These results are shown in Table 2.

0.3 part of an antioxidant, 2,6-di-t-butyl-p-cresol was added to 100 parts of the reaction liquid thus obtained in the manner as above, and the mixed solution was dropwise put into hot water heated at 85 to 95° C., little by little to evaporate away the solvent thereby giving a precipitate, and the precipitate was ground and dried with hot air at 85° C., and collected as a block copolymer composition 1. The obtained composition was fed into a single-screw extruder equipped with an in-water hot-cutting device at the tip of the extruder body thereof, thereby giving columnar pellets having a mean diameter of 5 mm and a mean length of 5 mm or so. The pellets were analyzed for the melt index of the block copolymer composition 1. The results are shown in Table 2.

Next, using a double-screw extruder equipped with a T-die, the pellets of the block copolymer composition 1 were hot-melted at 200° C., and extruded out continuously for 20 minutes to form a film having a thickness of 0.2 mm. The film of the block copolymer composition 1 was analyzed for the elastic modulus and the elongation set thereof. The results are shown in Table 2. The details of the condition for film formation are as follows:

Composition processing speed: 15 kg/hr
Film take-up speed: 10 m/min
Extruder temperature: Controlled to be 140° C. at the inlet port and 160° C. at the T-die
Screw: full-flight
Extruder L/D: 42
T-die: width 300 mm, lip 1 mm

Examples 2 to 4

In the same manner as in Example 1 except that the amounts of styrene, n-butyllithium, TMEDA, dimethyldichlorosilane and methanol were changed as shown in Table 1, the monomers were reacted; and a part of the reaction liquid was sampled and analyzed in the same manner as in Example 1. The results are shown in Table 2.

The subsequent operation was the same as in Example 1; and the block copolymer compositions 2 to 4 were collected and pelletized. The pellets were analyzed to determine the melt indexes of the block copolymer compositions. The results are shown in Table 2.

The pellets were formed into films of block copolymer compositions 2 to 4. The films were analyzed in the same manner as in Example 1. The results are shown in Table 2.

Example 5

23.3 kg of cyclohexane, 1.9 mmol of TMEDA and 1.30 kg of styrene were put into a pressure-resistant reactor, and with stirring them at 40° C., 126.2 mmol of n-butyllithium was added thereto, and polymerized for 1 hour with heating up to 50° C. The polymerization conversion of styrene was 100%.

Subsequently, with temperature controlled so as to keep the system at 50 to 60° C., 6.00 kg of isoprene was continuously added to the reactor, taking 1 hour. After the addition of isoprene, this was further polymerized for 1 hour. The polymerization conversion of isoprene was 100%.

Next, as a coupling agent, 26.5 mmol of dimethyldichlorosilane was added to and coupled with it for 2 hours to form a styrene/isoprene/styrene block copolymer to be the block copolymer B.

Then, 13.9 mmol of methanol was added to the reactor to thereby inactivate the active terminal of a part of the styrene/isoprene block copolymer. Subsequently, with temperature controlled so as to keep the system at 50 to 60° C., 2.70 kg of styrene was continuously added to it, taking 1 hour. After the addition of styrene, this was further polymerized for 1 hour to form a styrene/isoprene/styrene block copolymer to be the block copolymer A. The polymerization conversion of styrene was 100%.

After this, as a polymerization terminator, 252.3 mmol of methanol was added to it and well mixed to terminate the reaction.

A part of the thus-obtained reaction liquid was sampled, and analyzed in the same manner as in Example 1. The results are shown in Table 2.

The subsequent operation was the same as in Example 1; and the block copolymer composition 5 was collected and pelletized. The pellets were analyzed to determine the melt index of the block copolymer composition 5. The results are shown in Table 2.

The pellets were formed into a film of the block copolymer composition 5. The film was analyzed in the same manner as in Example 1. The results are shown in Table 2.

TABLE 1

|  | Example | | | | |
|---|---|---|---|---|---|
|  | 1 | 2 | 3 | 4 | 5 |
| Cyclohexane (*1) | 23.3 | 23.3 | 23.3 | 23.3 | 23.3 |
| TMEDA (*2) | 2.2 | 2.6 | 2.5 | 2.5 | 1.9 |
| N-butyllithium (*2) | 149.6 | 175.7 | 164.7 | 168.8 | 126.2 |
| Polymerization 1st stage | | | | | |
| Styrene (*1) | 1.40 | 1.80 | 1.60 | 1.60 | 1.30 |
| Polymerization 2nd stage | | | | | |
| Isoprene (*1) | 6.50 | 5.20 | 5.20 | 5.20 | 6.00 |
| After polymerization 2nd stage | | | | | |
| Dimethyldichlorosilane (*2) | 47.1 | 60.6 | 65.9 | 71.8 | 26.5 |
| Methanol (*2) | — | — | — | — | 13.9 |
| Polymerization 3rd stage | | | | | |
| Styrene (*1) | 2.10 | 3.00 | 3.20 | 3.20 | 2.70 |
| After polymerization 3rd stage | | | | | |
| Methanol (*2) | 299.1 | 351.4 | 329.4 | 337.7 | 252.3 |

|  | Comparative Example | | | | | | | |
|---|---|---|---|---|---|---|---|---|
|  | 1 | 2 | 3 | 4 | 5 | 6 | 7 | 8 |
| Cyclohexane (*1) | 23.3 | 23.3 | 23.3 | 23.3 | 23.3 | 23.3 | 23.3 | 23.3 |
| TMEDA (*2) | 2.5 | 2.2 | 1.2 | 2.0 | 1.9 | 2.4 | 4.5 | 4.1 |
| N-butyllithium (*2) | 169.9 | 148.2 | 77.9 | 135.1 | 125.8 | 158.8 | 80.0 | 80.0 |
| Polymerization 1st stage | | | | | | | | |
| Styrene (*1) | 1.50 | 1.85 | 4.15 | 2.23 | 1.43 | 1.51 | 3.14 | 2.60 |
| Polymerization 1st stage-2 | | | | | | | | |
| N-butyllithium (*2) | — | — | — | — | — | — | 220.0 | 190.0 |
| Styrene (*1) | — | — | — | — | — | — | 1.99 | 1.78 |
| Polymerization 2nd stage | | | | | | | | |
| Isoprene (*1) | 7.00 | 6.30 | 5.20 | 5.20 | 6.50 | 6.90 | 2.88 | 3.85 |
| After polymerization 2nd stage | | | | | | | | |
| Dimethyldichlorosilane (*2) | — | — | — | 21.6 | 25.8 | 57.9 | — | — |
| Methanol (*2) | — | — | — | — | — | — | — | — |
| Polymerization 3rd stage | | | | | | | | |
| Styrene (*1) | 1.50 | 1.85 | 0.65 | 2.57 | 2.07 | 1.59 | 1.99 | 1.78 |
| After polymerization 3rd stage | | | | | | | | |
| Methanol (*2) | 339.8 | 296.4 | 155.9 | 270.1 | 251.6 | 317.5 | 600.0 | 540.0 |

(*1) unit, Kg
(*2) unit, mmol

TABLE 2

|  | Example | | | | |
|---|---|---|---|---|---|
|  | 1 | 2 | 3 | 4 | 5 |
| Block Copolymer A | | | | | |
| Styrene block (Ar1$^a$) | | | | | |
| Weight-average molecular weight [Mw(Ar1$^a$)] | 9000 | 10400 | 10000 | 10000 | 11000 |
| Styrene block (Ar2$^a$) | | | | | |
| Weight-average molecular weight [Mw(Ar2$^a$)] | 75000 | 85000 | 153000 | 320000 | 75000 |
| Mw(Ar2$^a$)/Mw(Ar1$^a$) | 8.3 | 8.2 | 15.3 | 32.0 | 6.8 |
| Isoprene block (D$^a$) | | | | | |
| Weight-average molecular weight [Mw(D$^a$)] | 39000 | 36600 | 52000 | 62000 | 58000 |
| Vinyl bond content (%) | 7 | 7 | 7 | 7 | 7 |
| Whole block copolymer A | | | | | |
| Weight-average molecular weight | 123000 | 132000 | 215000 | 392000 | 144000 |
| Styrene unit content (%) | 52 | 69 | 77 | 82 | 50 |
| Block Copolymer B | | | | | |

TABLE 2-continued

|  | Example | | | | |
| --- | --- | --- | --- | --- | --- |
|  | 1 | 2 | 3 | 4 | 5 |
| Styrene blocks (Ar1[b], Ar2[b]) | | | | | |
| Weight-average molecular weight | 9000 | 10400 | 10000 | 10000 | 11000 |
| Isoprene block (D[b]) | | | | | |
| Weight-average molecular weight [Mw(D[b])] | 113000 | 99200 | 97000 | 95000 | 160000 |
| Vinyl bond content (%) | 7 | 7 | 7 | 7 | 7 |
| Whole block copolymer B | | | | | |
| Weight-average molecular weight | 131000 | 120000 | 117000 | 115000 | 182000 |
| Styrene unit content (%) | 18 | 26 | 23 | 23 | 18 |
| Block copolymer A/B | | | | | |
| Ratio by weight (A/B) | 50/50 | 45/55 | 42/58 | 63/37 | 80/20 |
| MW(D[b])/Mw(D[a]) | 2.9 | 2.7 | 1.9 | 1.5 | 2.8 |
| Styrene/isoprene block copolymer | | | | | |
| Styrene block | | | | | |
| Weight-average molecular weight | — | — | — | — | 11000 |
| Isoprene block | | | | | |
| Weight-average molecular weight | — | — | — | — | 80000 |
| Proportion in all polymer ingredients of composition | — | — | — | — | 8 |
| Block copolymer composition (whole) | 1 | 2 | 3 | 4 | 5 |
| Weight-average molecular weight | 124000 | 134000 | 149000 | 186000 | 149000 |
| Molecular weight distribution (Mw/Mn) | 1.11 | 1.12 | 1.21 | 1.50 | 1.10 |
| Styrene unit content (%) | 35 | 48 | 48 | 48 | 40 |
| Melt index (g/10 min) | 55 | 17 | 17 | 25 | 7 |
| Film Properties | | | | | |
| 50% elastic modulus (MPa) | 0.57 | 0.94 | 0.95 | 0.86 | 0.61 |
| Elongation set (%) | 2 | 4 | 4 | 4 | 3 |

Comparative Example 1

23.3 kg of cyclohexane, 2.5 mmol of TMEDA and 1.50 kg of styrene were put into a pressure-resistant reactor, and with stirring them at 40° C., 169.9 mmol of n-butyllithium was added thereto, and polymerized for 1 hour with heating up to 50° C. The polymerization conversion of styrene was 100%.

Subsequently, with temperature controlled so as to keep the system at 50 to 60° C., 7.00 kg of isoprene was continuously put into the reactor, taking 1 hour. After the addition of isoprene, this was further polymerized for 1 hour. The polymerization conversion of isoprene was 100%.

Subsequently, with temperature controlled so as to keep the system at 50 to 60° C., 1.50 kg of styrene was continuously added, taking 1 hour. After the addition of styrene, this was further polymerized for 1 hour to give a styrene/isoprene/styrene block copolymer. The polymerization conversion of styrene was 100%.

After this, as a polymerization terminator, 339.8 mmol of methanol was added to it and well mixed to terminate the reaction.

A part of the thus-obtained reaction liquid was sampled, and analyzed in the same manner as in Example 1. The results are shown in Table 3.

The subsequent operation was the same as in Example 1; and the block copolymer composition C1 was collected and pelletized. The pellets were analyzed to determine the melt index of the block copolymer composition C1. The results are shown in Table 3.

The pellets were formed into a film of the block copolymer composition C1. The film was analyzed in the same manner as in Example 1. The results are shown in Table 3.

Comparative Examples 2 and 3

In the same manner as in Comparative Example 1 except that the amounts of styrene, n-butyllithium, TMEDA, isoprene and methanol were changed as shown in Table 1, the monomers were reacted. A part of the reaction liquid was sampled and analyzed in the same manner as in Example 1. The results are shown in Table 3.

The subsequent operation was the same as in Example 1; and the block copolymer compositions C2 and C3 were collected and pelletized. The pellets were analyzed to determine the melt indexes of the block copolymer compositions C2 and C3. The results are shown in Table 3.

The pellets were formed into films of the block copolymer compositions C2 and C3. The films were analyzed in the same manner as in Example 1. The results are shown in Table 3.

TABLE 3

|  | Comparative Example | | | |
| --- | --- | --- | --- | --- |
|  | 1 | 2 | 3 | 4 |
| Block Copolymer A | | | | |
| Styrene block (Ar1[a]) | | | | |
| Weight-average molecular weight [Mw(Ar1[a])] | — | — | 15000 | 18500 |

TABLE 3-continued

| | C1 | C2 | C3 | C4 |
|---|---|---|---|---|
| Styrene block (Ar2$^a$) | | | | |
| Weight-average molecular weight [Mw(Ar2$^a$)] | — | — | 76000 | 60000 |
| Mw(Ar2$^a$)/Mw(Ar1$^a$) | — | — | 5.1 | 3.2 |
| Isoprene block (D$^a$) | | | | |
| Weight-average molecular weight [Mw(D$^a$)] | — | — | 133000 | 64500 |
| Vinyl bond content (%) | — | — | 7 | 7 |
| Whole block copolymer A | | | | |
| Weight-average molecular weight | — | — | 224000 | 143000 |
| Styrene unit content (%) | — | — | 48 | 56 |
| Block Copolymer B | | | | |
| Styrene blocks (Ar1$^b$, Ar2$^b$) | | | | |
| Weight-average molecular weight | 13000 | 15000 | — | 18500 |
| Isoprene block (D$^b$) | | | | |
| Weight-average molecular weight [Mw(D$^b$)] | 50000 | 62000 | — | 126000 |
| Vinyl bond content (%) | 7 | 7 | — | 7 |
| Whole block copolymer B | | | | |
| Weight-average molecular weight | 76000 | 92000 | — | 163000 |
| Styrene unit content (%) | 30 | 37 | — | 30 |
| Block copolymer A/B | | | | |
| Ratio by weight (A/B) | — | — | — | (70)/30 |
| MW(D$^b$)/Mw(D$^a$) | — | — | — | 2.0 |
| Styrene/isoprene block copolymer | | | | |
| Styrene block | | | | |
| Weight-average molecular weight | — | — | — | — |
| Isoprene block | | | | |
| Weight-average molecular weight | — | — | — | — |
| Proportion in all polymer ingredients of composition | — | — | — | — |
| Block copolymer composition (whole) | C1 | C2 | C3 | C4 |
| Weight-average molecular weight | 76000 | 92000 | 224000 | 140000 |
| Molecular weight distribution (Mw/Mn) | 1.02 | 1.02 | 1.03 | 1.15 |
| Styrene unit content (%) | 30 | 37 | 48 | 48 |
| Melt index (g/10 min) | 14 | 37 | 0.3 | 4 |
| Film Properties | | | | |
| 50% elastic modulus (MPa) | 0.31 | 1.06 | 0.13 | 0.93 |
| Elongation set (%) | 6 | 15 | 85 | 25 |

| | Comparative Example | | | |
|---|---|---|---|---|
| | 5 | 6 | 7 | 8 |
| Block Copolymer A | | | | |
| Styrene block (Ar1$^a$) | | | | |
| Weight-average molecular weight [Mw(Ar1$^a$)] | 10500 | 11000 | 7300 | 7300 |
| Styrene block (Ar2$^a$) | | | | |
| Weight-average molecular weight [Mw(Ar2$^a$)] | 15000 | 72000 | 50500 | 43000 |
| Mw(Ar2$^a$)/Mw(Ar1$^a$) | 1.4 | 6.5 | 6.9 | 5.9 |
| Isoprene block (D$^a$) | | | | |
| Weight-average molecular weight [Mw(D$^a$)] | 67500 | 65000 | 27000 | 34000 |
| Vinyl bond content (%) | 7 | 7 | 7 | 7 |
| Whole block copolymer A | | | | |
| Weight-average molecular weight | 93000 | 148000 | 84800 | 84300 |
| Styrene unit content (%) | 44 | 52 | 85 | 76 |
| Block Copolymer B | | | | |
| Styrene blocks (Ar1$^b$, Ar2$^b$) | | | | |
| Weight-average molecular weight | 10500 | 11000 | 7300 | 7300 |
| Isoprene block (D$^b$) | | | | |
| Weight-average molecular weight [Mw(D$^b$)] | 159000 | 127000 | 27000 | 34000 |
| Vinyl bond content (%) | 7 | 7 | 7 | 7 |
| Whole block copolymer B | | | | |
| Weight-average molecular weight | 180000 | 149000 | 41600 | 48600 |
| Styrene unit content (%) | 18 | 18 | 58 | 48 |

TABLE 3-continued

| Block copolymer A/B | | | | |
|---|---|---|---|---|
| Ratio by weight (A/B) | 65/(35) | 35/65 | 50/(50) | 48/(52) |
| MW($D^b$)/Mw($D^a$) | 2.4 | 2.0 | 1.0 | 1.0 |
| Styrene/isoprene block copolymer | | | | |
| Styrene block | | | | |
| Weight-average molecular weight | — | — | — | — |
| Isoprene block | | | | |
| Weight-average molecular weight | — | — | — | — |
| Proportion in all polymer ingredients of composition | — | — | — | — |
| Block copolymer composition (whole) | C5 | C6 | C7 | C8 |
| Weight-average molecular weight | 124000 | 148000 | 63000 | 66000 |
| Molecular weight distribution (Mw/Mn) | 1.24 | 1.10 | 1.20 | 1.20 |
| Styrene unit content (%) | 35 | 31 | 71 | 62 |
| Melt index (g/10 min) | 14 | 23 | 20 | 25 |
| Film Properties | | | | |
| 50% elastic modulus (MPa) | 0.96 | 0.41 | 0.95 | 1.21 |
| Elongation set (%) | 12 | 3 | 80 | 30 |

Comparative Examples 4 to 6

In the same manner as in Comparative Example 1 except that the amounts of styrene, n-butyllithium, TMEDA, isoprene, dimethyldichlorosilane and methanol were changed as shown in Table 1, the monomers were reacted. A part of the reaction liquid was sampled and analyzed in the same manner as in Example 1. The results are shown in Table 3.

The subsequent operation was the same as in Example 1; and the block copolymer compositions C4 to C6 were collected and pelletized. The pellets were analyzed to determine the melt indexes of the block copolymer compositions C4 to C6. The results are shown in Table 3.

The pellets were formed into films of the block copolymer compositions C4 to C6. The films were analyzed in the same manner as in Example 1. The results are shown in Table 3.

Comparative Example 7

23.3 kg of cyclohexane, 4.5 mmol of TMEDA and 3.14 kg of styrene were put into a pressure-resistant reactor, and with stirring them at 40° C., 80.0 mmol of n-butyllithium was added thereto, and polymerized for 1 hour with heating up to 50° C. The polymerization conversion of styrene was 100%.

Subsequently, with temperature controlled so as to keep the system at 50 to 60° C., 220.0 mmol of n-butyllithium was added to the reactor, and after the addition, 1.99 kg of styrene was continuously added thereto, taking 30 minutes. After the addition of styrene, this was further polymerized for 1 hour. The polymerization conversion of styrene was 100%.

Further subsequently, with temperature controlled so as to keep the system at 50 to 60° C., 2.88 kg of isoprene was continuously added to the reactor, taking 1 hour. After the addition of styrene, this was further polymerized for 1 hour. The polymerization conversion of isoprene was 100%. After this, 1.99 kg of styrene was continuously added to the reactor, taking 30 minutes. After the addition of styrene, this was further polymerized for 1 hour thereby giving two types of styrene/isoprene/styrene block copolymers with one of the respective two styrene blocks having a different molecular weight from each other. The polymerization conversion of styrene was 100%.

After this, 600.0 mmol of methanol as a polymerization terminator was added to it and well mixed to terminate the reaction.

A part of the thus-obtained reaction liquid was sampled, and analyzed in the same manner as in Example 1. The results are shown in Table 3.

The subsequent operation was the same as in Example 1; and the block copolymer composition C7 was collected and pelletized. The pellets were analyzed to determine the melt index of the block copolymer composition C7. The results are shown in Table 3.

The pellets were formed into a film of the block copolymer composition C7. The film was analyzed in the same manner as in Example 1. The results are shown in Table 3.

Comparative Example 8

In the same manner as in Comparative Example 7 except that the amounts of styrene, n-butyllithium, TMEDA, isoprene and methanol were changed as shown in Table 1, the monomers were reacted. A part of the reaction liquid was sampled and analyzed in the same manner as in Example 1. The results are shown in Table 3.

The subsequent operation was the same as in Example 1; and the block copolymer composition C8 was collected and pelletized. The pellets were analyzed to determine the melt index of the block copolymer composition C8. The results are shown in Table 3.

The pellets were formed into a film of the block copolymer composition C8. The film was analyzed in the same manner as in Example 1. The results are shown in Table 3.

The results shown in Tables confirm the following. Specifically, the films formed of the block copolymer composition of the invention each have a high elastic modulus and a small elongation set (Examples 1 to 5). As opposed to these, the films formed of the single styrene/isoprene/styrene block copolymer each have a large elongation set (Comparative Examples 1 to 3), and often have a low elastic modulus (Comparative Examples 1 to 3). Even though films are formed of two types of styrene/isoprene/styrene block copolymers, they have a large elongation set in case where the weight-average molecular weight of any polymer block in the copolymer falls outside the range defined in the invention (Comparative Examples 4, 5, 7 and 8), and in case where the ratio by weight of the block copolymers (A/B) is smaller than the range defined in the invention, the film has a low elastic modulus (Comparative Example 6). Accordingly, it can be said that the block copolymer composition of the invention has a high-level balance between a high elastic modulus and a small elongation set.

The invention claimed is:

1. A block copolymer composition comprising a block copolymer A represented by the following general formula (A) and a block copolymer B represented by the following general formula (B), wherein the ratio by weight of the block copolymer A to the block copolymer B (A/B) is from 36/64 to 85/15, and the proportion of aromatic vinyl monomer units relative to all the polymer components in the block copolymer composition is from 27 to 60% by weight:

  (A)

  (B);

(in the general formulae (A) and (B), $Ar1^a$, $Ar1^b$ and $Ar2^b$ each represent an aromatic vinyl polymer block having a weight-average molecular weight of from 6,000 to 18,000; $Ar2^a$ represents an aromatic vinyl polymer block having a weight-average molecular weight of from 40,000 to 400,000; $D^a$ represents a conjugated diene polymer block having a vinyl bond content of from 1 to 20% by mol; and $D^b$ represents a conjugated diene polymer block having a vinyl bond content of from 1 to 20 mol % and having a weight-average molecular weight of from 60,000 to 400,000).

2. A film formed by shaping the block copolymer composition of claim 1.

3. A method for producing the block copolymer composition of claim 1, comprising the following steps (1) to (5):
 (1): a step of polymerizing an aromatic vinyl monomer by using a polymerization initiator in a solvent,
 (2): a step of adding a conjugated diene monomer to the solution containing the aromatic vinyl polymer having an active terminal obtained in the above step (1),
 (3): a step of adding a bifunctional coupling agent to the solution containing the aromatic vinyl-conjugated diene block copolymer having an active terminal obtained in the above step (2), in such an amount that the functional group is less than 1 molar equivalent relative to the active terminal, thereby forming the block copolymer B,
 (4): a step of adding an aromatic vinyl monomer to the solution obtained in the above step (3) to form the block copolymer A, and
 (5) a step of collecting the block copolymer composition from the solution obtained in the above step (4).

* * * * *